(12) United States Patent
Przybylo et al.

(10) Patent No.: US 12,697,906 B2
(45) Date of Patent: Aug. 4, 2026

(54) LOAD RESTRAINT FOR A ROTATABLE SEAT

(71) Applicant: CYBEX GmbH, Bayreuth (DE)

(72) Inventors: Phillip Andrew Przybylo, Waxhaw, NC (US); Steven Gregory Marcus, Charlotte, NC (US)

(73) Assignee: CYBEX GmbH, Bayreuth (DE)

( * ) Notice: Subject to any disclaimer, the term of this patent is extended or adjusted under 35 U.S.C. 154(b) by 266 days.

(21) Appl. No.: 18/487,721

(22) Filed: Oct. 16, 2023

(65) Prior Publication Data

US 2025/0121748 A1 Apr. 17, 2025

(51) Int. Cl.
 *B60N 2/28* (2006.01)
(52) U.S. Cl.
 CPC ......... *B60N 2/2869* (2013.01); *B60N 2/2821* (2013.01)
(58) Field of Classification Search
 CPC ............................ B60N 2/2869; B60N 2/2821
 See application file for complete search history.

(56) References Cited

U.S. PATENT DOCUMENTS

| | | | |
|---|---|---|---|
| 4,936,629 | A | 6/1990 | Young |
| 6,431,647 | B2 | 8/2002 | Yamazaki |
| 6,722,737 | B2 | 4/2004 | Kanai |
| 6,746,080 | B2 | 6/2004 | Tsugimatsu et al. |
| 7,357,451 | B2 | 4/2008 | Bendure et al. |
| 7,614,692 | B2 | 11/2009 | Biaud |

| | | | |
|---|---|---|---|
| 10,322,651 | B2 | 6/2019 | Hutchinson et al. |
| 10,457,168 | B2 | 10/2019 | Anderson et al. |
| 11,420,540 | B2 | 8/2022 | Williams |
| 11,427,114 | B2 | 8/2022 | Keegan et al. |

(Continued)

FOREIGN PATENT DOCUMENTS

| | | |
|---|---|---|
| JP | 4601849 B2 | 10/2010 |
| WO | 2025085420 | 4/2025 |

OTHER PUBLICATIONS

"International Application Serial No. PCT US2024 051371, International Search Report mailed Feb. 7, 2025", 5 pages.

(Continued)

*Primary Examiner* — David R Dunn
*Assistant Examiner* — Tania Abraham
(74) *Attorney, Agent, or Firm* — Schwegman Lundberg & Woessner, P.A.

(57) ABSTRACT

An example includes a device having a base platform, a seat platform, and a swivel joint. The base platform is configured for affixation to an occupant seat of a motor vehicle. The base platform has a first and second base retainer component. The seat platform has a seat portion and a back portion. The seat platform has a first and a second seat retainer complement. The swivel joint couples the base platform and the seat platform and permits relative motion of the base platform and the seat platform about a rotary axis and constrain motion on other axes. At a first position of the base platform relative to the seat platform, the first seat retainer complement aligns with the first base retainer component. At a second position of the base platform relative to the seat platform (second position different than the first position), the second seat retainer complement aligns with the second base retainer component.

26 Claims, 7 Drawing Sheets

(56) References Cited

U.S. PATENT DOCUMENTS

| | | | |
|---|---|---|---|
| 11,752,904 B2 * | 9/2023 | Li | B60N 2/2806 |
| | | | 297/256.12 |
| 2008/0054694 A1 | 3/2008 | Lhomme et al. | |
| 2015/0336481 A1 * | 11/2015 | Horsfall | B60N 2/2806 |
| | | | 297/256.16 |
| 2017/0355287 A1 * | 12/2017 | Anderson | B60N 2/2806 |
| 2022/0048415 A1 * | 2/2022 | Keegan | B60N 2/268 |
| 2022/0355713 A1 | 11/2022 | Longenecker et al. | |
| 2023/0294570 A1 | 9/2023 | Line et al. | |

OTHER PUBLICATIONS

"International Application Serial No. PCT US2024 051371, Written Opinion mailed Feb. 7, 2025", 5 pages.

* cited by examiner

LOAD RESTRAINT FOR A ROTATABLE SEAT

TECHNICAL FIELD

This document pertains generally, but not by way of limitation, to a child safety seat for use with a motor vehicle.

BACKGROUND

A child safety seat provides improved safety for the occupant in the event of a vehicle collision. To maximize the safety benefit, it is imperative that the seat is properly positioned and anchored to the motor vehicle. In addition, the occupant must be properly fitted to the seat and oriented in the proper manner based on age, weight, and other factors.

To accommodate a wide variety of occupant ages and sizes, some manufacturers offer a convertible seat which can be affixed to the vehicle in either a forward-facing or a rearward-facing mode.

Some manufacturers offer a seat configured to swivel. For examples, see the following: U.S. Pat. No. 10,457,168 refers to a child safety seat; U.S. Pat. No. 10,322,651 refers to a child safety seat; JP 4601849 B2 refers to a child seat; U.S. Pat. No. 6,746,080 refers to a child car seat; U.S. Pat. No. 11,427,114 refers to a booster seat to base attachment mechanism; U.S. Pat. No. 7,614,692 refers to a child car seat swiveling between a forward facing position and a door facing position, with automatic return to forward facing position; U.S. Pat. No. 6,431,647 refers to a swivel child car seat; U.S. Pat. No. 7,357,451 refers to a swivelable car seat; US 2008/0054694 refers to a child restraint with swiveling juvenile seat and swivel-status indicator; U.S. Pat. No. 4,936,629 refers to a swiveling infant car seat; and U.S. Pat. No. 11,420,540 refers to a child safety seat and related spin lock mechanism.

Notwithstanding these approaches, product costs and product complexities limit the market for a child safety seat with a swivel.

SUMMARY

The present inventors have recognized, among other things, that a problem to be solved can include reducing product cost and simplifying the design. An example of the present subject matter addresses these problems by providing a rotatable seat having a latch configuration that simplifies rotation, ensures reliable operation, and provides a robust connection between the occupant and the motor vehicle.

One example includes a base platform configured for attachment to the motor vehicle. A seat platform is coupled to the base platform by structure including a swivel joint and a plurality of retainer pairs. A retainer pair can refer to a retainer component and a corresponding retainer complement. For example, a retainer component can include a hook and a retainer complement can include similarly shaped hook or flange. In a first position (such as occupant forward-facing), a first set of retainer pairs are engaged and a second set of retainer pairs are disengaged and in a second position (such as occupant rearward-facing), the first set of retainer pairs are disengaged and the second set of retainer pairs are engaged.

One example includes a device having a base platform, a seat platform, and a swivel joint. The base platform is configured for affixation to an occupant seat of a motor vehicle. The base platform has a first base retainer component and a second base retainer component. The seat platform has a seat portion and a back portion. The seat platform has a first seat retainer complement and a second seat retainer complement. The swivel joint couples the base platform and the seat portion and permits relative motion of the base platform and the seat platform about a rotary axis and constrain motion on other axes. At a first position of the base platform relative to the seat platform, the first seat retainer complement aligns with the first base retainer component. At a second position of the base platform relative to the seat platform (the second position different than the first position), the second seat retainer complement aligns with the second base retainer component.

A retainer pair can include a retainer component and a corresponding retainer complement configured to allow regular engagement or regular separation. User manipulation of the child seat, without resort to using a tool, is sufficient to achieve regular engagement or regular separation. According to some examples, the retainer component and the corresponding retainer complement can be similar, indistinguishable, or a mirror image. For example, the retainer component can include a first hook and the retainer complement can include a second hook configured to engage with the first hook. According to some examples, the retainer component and the corresponding retainer complement can be dissimilar. For example, the retainer component can include a bolt and the retainer complement can include a fitted channel configured to receive a head of the bolt. In various examples, one of the retainer component and the retainer complement can include a hook, a cleat, a bolt, a flange, a stud, a rail, a track, a channel, or a latch. In various examples, the other one of the retainer component and the retainer complement can include a hook, a cleat, a rail, a track, a channel, a flange, a stud, a slot, or a catch.

A retainer component can remain affixed to a base platform or affixed to a seat platform and similarly, a retainer complement can remain affixed to a base platform or affixed to a seat platform.

A retainer component and a corresponding retainer complement can include a hook element. The hook element can include a cantilevered, or curved open segment carried by a shank or a shaft. In some examples, the curved open segment can be described as ring-like and the shank can have a flat bar section.

Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
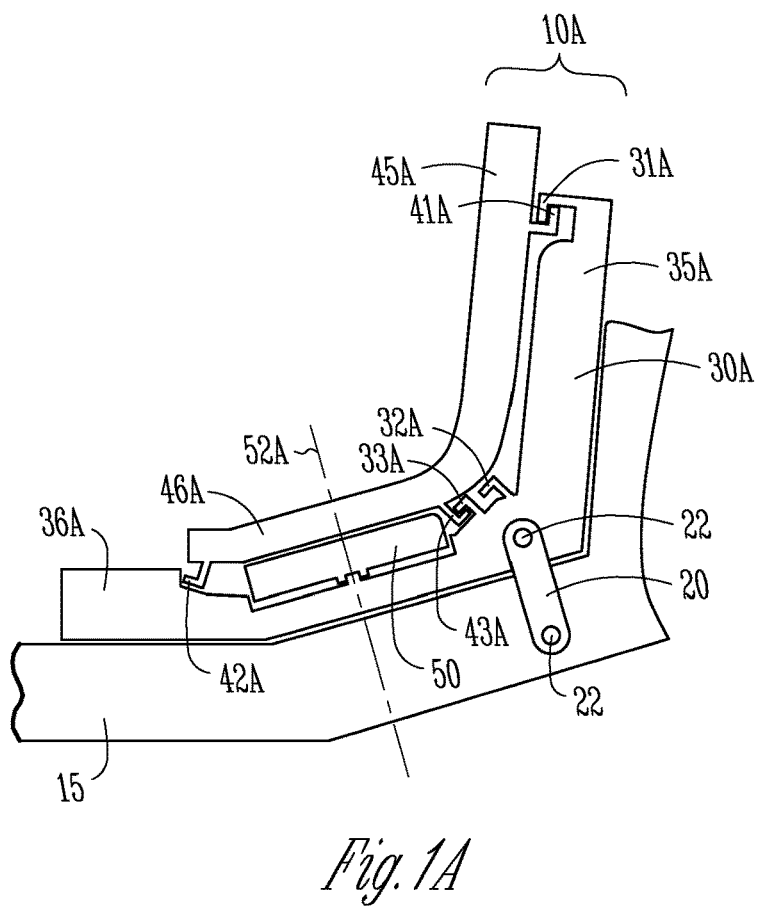
FIG. 1A illustrates a schematic representation of a forward-facing child seat, according to one example.
Figure 1B:
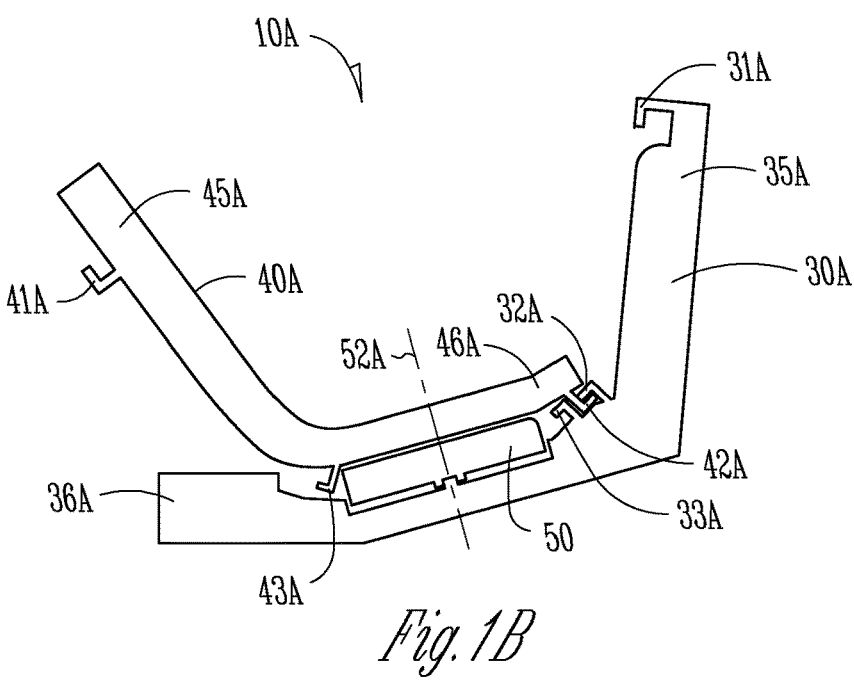
FIG. 1B illustrates a schematic representation of a rearward-facing child seat, according to one example.

FIGS. 1A and 1B illustrate a schematic representation of a side view of child seat (or child safety seat) 10A, according to one example. Seat 10A includes, among other things, seat platform 40A and base platform 30A.

In FIG. 1A, seat 10A is arranged in a forward-facing position in the context of motor vehicle 15. Motor vehicle 15 can be viewed as an occupant seat of the vehicle and in the figure, the front of the vehicle is on the left and the rear of the vehicle is on the right. As shown in the FIGS. 1A and 1B, seat platform 40A is configured to receive a seated occupant with buttocks and legs adjacent seat portion 46A and shoulders and back adjacent back portion 45A.

The figures also illustrate base platform 30A configured to receive seat platform 40A. Base platform 30A includes lower portion 36A and upper portion 35A. As shown in FIG. 1A, base platform 30A is fastened to motor vehicle 15 by anchoring means 20. Anchoring means 20 is affixed to motor vehicle 15 and affixed to base platform 30A by fasteners 22. Anchoring means 20 can include, in various examples, a metal strap, a plastic strap, a cord, a chain, a tether, or a cable.

Base platform 30A is coupled to seat platform 40A by swivel joint 50. Swivel joint 50 has rotary axis 52A which allows relative motion as to base platform 30A, as to seat platform 40A, or as to both base platform 30A and seat platform 40A. In one example, swivel joint 50 is affixed rigidly to, or immobilized on, base platform 30A. In one example, swivel joint 50 is affixed rigidly to, or immobilized on, seat platform 40A and in one example, swivel joint 50 is rotatable independent of base platform 30A and independent of seat platform 40A. Swivel joint 50 can include a rotary bearing assembly which can include a plain bushing, a roller bearing, a needle bearing, a fifth wheel (bolster plate), or other structure to enable rotation about the rotary axis 52A and prevent or resist movement along an axis other than rotary axis 52A.

Seat 10A includes a plurality of retainer components including, in the example shown, first base retainer component 31A, second base retainer component 32A, and third base retainer component 33A. In addition, seat 10A includes first seat retainer complement 41A, second seat retainer complement 42A, and third seat retainer complement 43A.

As shown, first base retainer component 31A is affixed to upper portion 35A of base platform 30A. Second base retainer component 32A is affixed at a location proximate to a junction or transition between the upper portion 35A and lower portion 36A. Third base retainer component 33A is also affixed at a location proximate the junction between the upper portion 35A and lower portion 36A and closer to lower portion 36A.

Also as shown, first seat retainer complement 41A is affixed to back portion 45A of seat platform 40A. Second seat retainer complement 42A is affixed to seat portion 46A distal to a junction or transition between back portion 45A and seat portion 46A. Third seat retainer complement 43A is affixed at a location proximate to the junction or transition and closer to seat portion 46A.

Seat platform 40A is configured for rotary motion about axis 52A relative to base platform 30A. FIG. 1A depicts a first position in which the occupant of child seat 10A faces in a forward-facing direction. In this configuration, in the event of a frontal impact collision of motor vehicle 15, deceleration forces act on the occupant secured in seat 10A. The occupant of seat 10A is bound to seat platform 40A by straps, belts, buckles, or other retention structure. The deceleration forces on the occupant act on the seat platform 40A by the occupant retention structure, and thus, act on the base platform 30A by the couplings between the seat platform 40A and the base platform 30A. The base platform 30A is substantially immobilized relative to the vehicle by anchor means 20, by other structural elements (such as a vehicle seat belt or anchor), or by both anchor means 20 and other structural elements.

With seat 10A in the first position as shown, first base retainer component 31A and first seat retainer complement 41A are in alignment and coupled together in an interlocking manner. In addition, the example shown provides that third base retainer component 33A and third seat retainer complement 43A are in alignment and coupled together in an interlocking manner. Swivel joint 50 precludes axial movement in a direction aligned with axis 52B and precludes movement in a shear direction relative to axis 52B. Swivel joint 50 is configured to sustain a combination of shear loading and tensile loading tending to separate the base platform 30A and seat platform 40A.

FIG. 1B depicts a second position in which the occupant of child seat 10A faces in a rearward-facing direction. In this configuration, in the event of a frontal impact collision of motor vehicle 15, the deceleration forces on the occupant act on the seat platform 40A by direct contact and by an occupant retention structure, and thus, act on base platform 30A and motor vehicle 15.

With seat 10A in the second position as shown, second base retainer component 32A and second seat retainer complement 42A are in alignment and coupled together in an interlocking manner. The combination of interlocked second base retainer component 32A and second seat retainer complement 42A, along with swivel joint 50, retains seat platform 40A relative to base platform 30A.

By way of summary, in a forward-facing position, seat platform 40A and base platform 30A are coupled together by a combination of swivel joint 50 along with engaged, or interlocked retainer pairs, such as first base retainer component 31A with first seat retainer complement 41A, or third base retainer component 33A with third seat retainer complement 43A.

Also, by way of summary, in a rearward-facing position, seat platform 40A and base platform 30A are coupled together by a combination of swivel joint 50 along with interlocked retainer pairs, such as second base retainer component 32A with second seat retainer complement 42A.

Figure 2A:
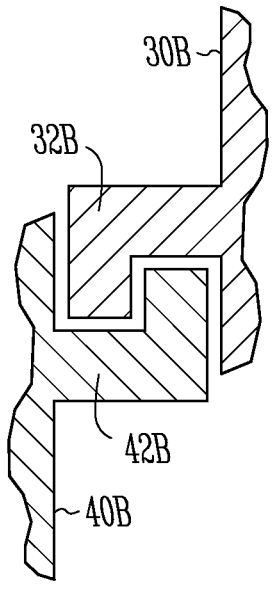
FIGS. 2A-2C illustrate engaged retainer pairs, according to various examples.

In FIGS. 1A and 1B, the retainer pairs are schematically represented as cantilever leg hook elements. FIG. 2A provides a schematic view of an example of a retainer pair, here represented as interlocked cantilever leg hook elements. In FIG. 2A, second base retainer component 32B and second seat retainer complement 42B each include a hook member in which a cantilevered element is arranged orthogonal to an anchor element which has an end coupled to base platform 30B or coupled to seat platform 40B. Second base retainer component 32B and second seat retainer complement 42B are aligned in a manner to engage as shown with movement constrained by rotation about axis 52A (FIGS. 1A and 1B). Constrain indicates limiting or restricting but not wholly precluding. In addition, the figure illustrates second base retainer component 32B and second seat retainer complement 42B in an interlocked relationship. The figure depicts retainer component 32B and retainer complement 42B and it will be understood that other retainer pairs align and interlock in a similar manner.

Figure 2B:
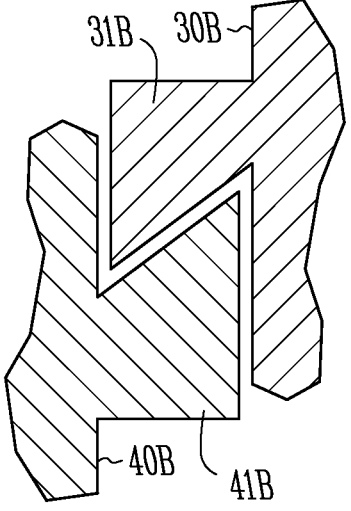

FIG. 2B illustrates a schematic view of a retainer pair including interlocked cleats, according to one example. In this example, retainer component 31B and retainer complement 41B have a cross-section profile sometimes referred to as a French cleat. As shown, retainer component 31B and retainer complement 41B have an angular relationship on complementary faces. The complementary faces, in conjunction with limited freedom of movement accorded by swivel joint 50, precludes separation of base platform 30B and seat platform 40B in the example shown. Here, the figure depicts retainer component 31B and retainer complement 41B and it will be understood that other retainer pairs align and interlock in a similar manner. In one example, a cleat can include a flange having a contact surface set at a particular angle.

Figure 2C:
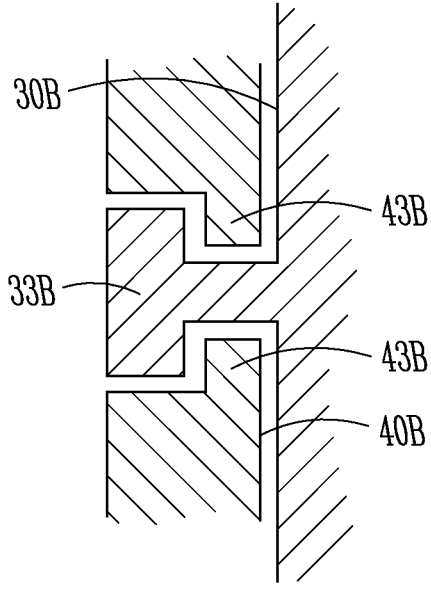

FIG. 2C illustrates a schematic view of a retainer pair having interlocked components. In this example, third base retainer component 33B has a narrow section coupled to a broad section wherein the broad section has a dimension that precludes passage through a corresponding narrow section of a complementary component, here, third seat retainer complement 43B. In the figure, retainer component 33B can included a bolt, a tee-nut, or a segment of a flange having a tee-section and retainer complement 43B can include a keyhole slot, a tee-slot, a rail, or a channel. As shown, the dimensional relationship between structural elements of the retainer pair, here retainer component 33B and retainer complement 43B, precludes separation of base platform 30B and seat platform 40B. Here, the figure depicts retainer component 33B and retainer complement 43B and it will be understood that other retainer pairs align and interlock in a similar manner.

Figure 2D:
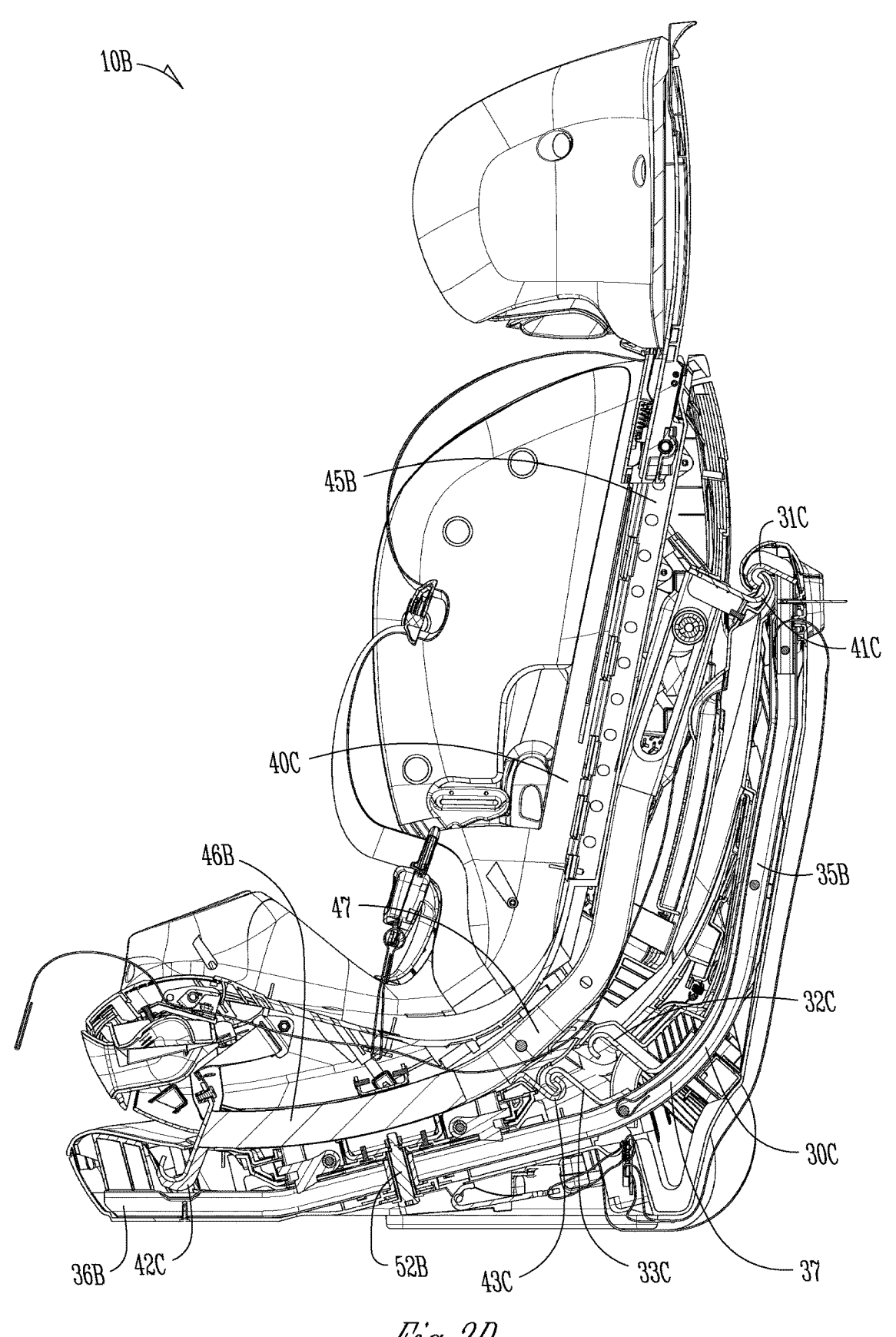
FIG. 2D illustrates a partial section view of a forward-facing child seat, according to one example.
Figure 2E:
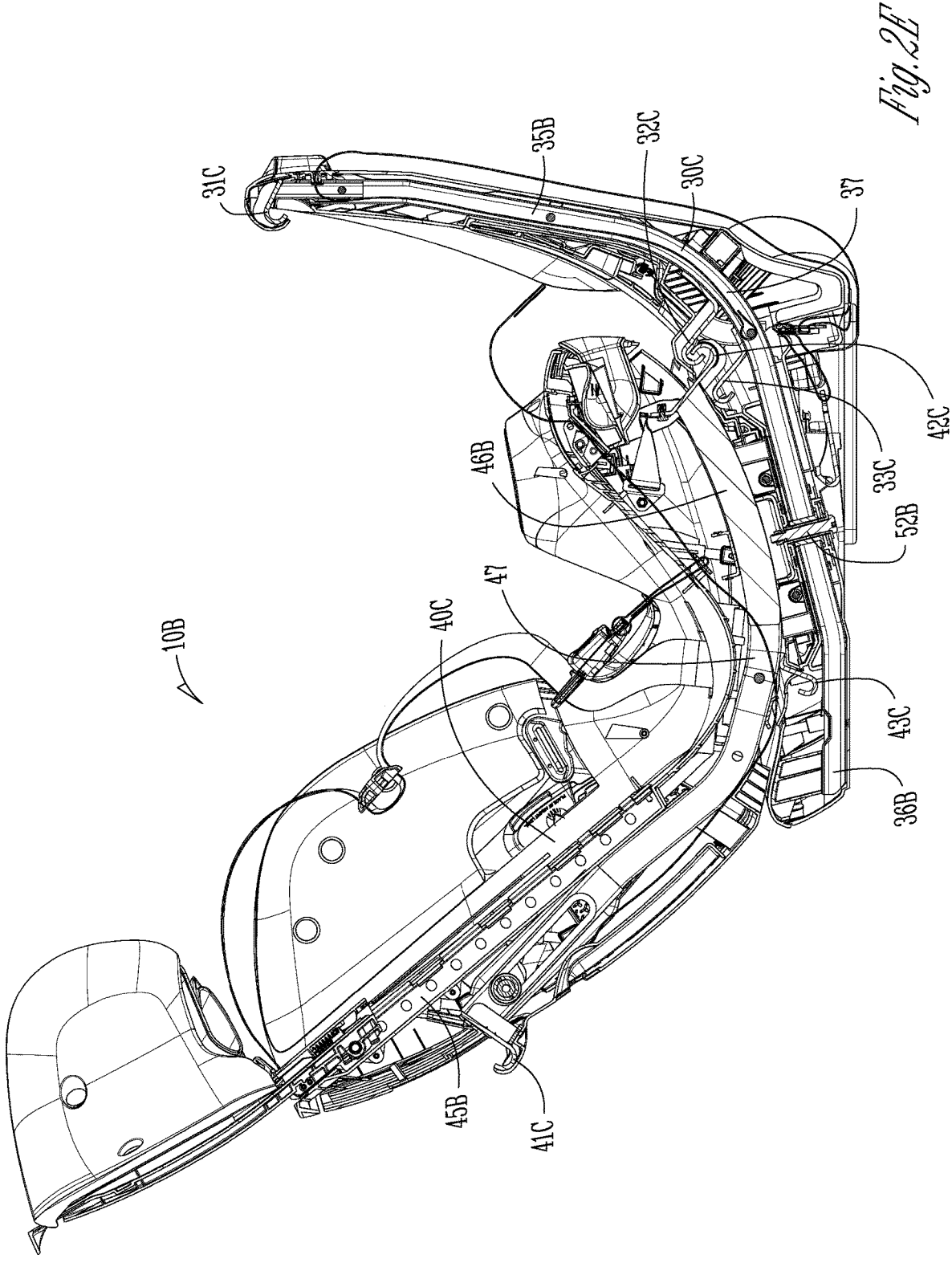
FIG. 2E illustrates a partial section view of a rearward-facing child seat, according to one example.

FIGS. 2D and 2E illustrate partial section views of a child seat arranged in a forward-facing direction and a rearward-facing direction, respectively, according to one example.

As shown in the FIGS. 2D and 2E, seat platform 40C is configured to receive a seated occupant with buttocks and legs adjacent seat portion 46B and shoulders and back adjacent back portion 45B.

The figures also illustrate base platform 30C configured to receive seat platform 40C. Base platform 30C includes lower portion 36B and upper portion 35B.

Seat 10B includes a plurality of retainer components including, in the example shown, first base retainer component 31C, second base retainer component 32C, and third base retainer component 33C. In addition, seat 10B includes first seat retainer complement 41C, second seat retainer complement 42C, and third seat retainer complement 43C.

As shown, first base retainer component 31C is affixed to upper portion 35B of base platform 30C. Second base retainer component 32C is affixed at a location proximate to a junction or transition between the upper portion 35B and lower portion 36B. Third base retainer component 33C is also affixed at a location proximate the junction between the upper portion 35B and lower portion 36B and closer to lower portion 36B.

Also as shown, first seat retainer complement 41C is affixed to back portion 45B of seat platform 40C. Second seat retainer complement 42C is affixed to seat portion 46B distal to junction 47 or transition between back portion 45B and seat portion 46B. Third seat retainer complement 43C is affixed at a location proximate to the junction or transition and closer to seat portion 46B.

Seat platform 40C is configured for rotary motion about axis 52B relative to base platform 30C. FIG. 2D depicts a first position in which the occupant of the child seat faces in a forward-facing direction. In this configuration, in the event of a frontal impact collision, deceleration forces act on the occupant secured in the seat. The occupant is bound to seat platform 40C by straps, belts, buckles, or other retention structure. The deceleration forces on the occupant act on the seat platform 40C by the occupant retention structure, and thus, act on the base platform 30C by the couplings between the seat platform 40C and the base platform 30C. The base platform 30C is substantially immobilized relative to the vehicle by an anchor means, by other structural elements (such as a vehicle seat belt or anchor), or by both anchor means and other structural elements.

With seat in the first position as shown in FIG. 2D, first base retainer component 31C and first seat retainer complement 41C are in alignment and coupled together in an interlocking manner. In addition, the example shown provides that third base retainer component 33C and third seat retainer complement 43C are in alignment and coupled together in an interlocking manner.

FIG. 2E depicts a second position in which the occupant of the child seat faces in a rearward-facing direction. In this configuration, in the event of a frontal impact collision, the deceleration forces on the occupant act on the seat platform 40C by direct contact and by an occupant retention structure, and thus, act on base platform 30C and the motor vehicle.

With the seat in the second position as shown in FIG. 2E, second base retainer component 32C and second seat retainer complement 42C are in alignment and coupled together in an interlocking manner. The combination of interlocked second base retainer component 32C and second seat retainer complement 42C, along with axis 52B, retains seat platform 40C relative to base platform 30C.

By way of summary, in a forward-facing position, seat platform 40C and base platform 30C are coupled together by a combination of a swivel joint along with engaged, or interlocked retainer pairs, such as first base retainer component 31C with first seat retainer complement 41C, or third base retainer component 33C with third seat retainer complement 43C.

Also, by way of summary, in a rearward-facing position, seat platform 40C and base platform 30C are coupled together by a combination of a swivel joint along with interlocked retainer pairs, such as second base retainer component 32C with second seat retainer complement 42C.

In FIGS. 2D and 2E, the retainer pairs are represented as cantilever leg hook elements.

FIG. 2D illustrates a view of retainer components 32C and 33C, and retainer complement 43C, each of which are configured as hook elements, according to one example. In the example shown, retainer components 32C and 33C, and retainer complement 43C each has a curved portion coupled to a shank or straight segment. The straight segments of retainer components 32C and 33C are coupled to junction 37 at the transition between upper portion 35B and lower portion 36B of base platform 30C. The straight segment of retainer complement 43C is coupled to junction 47 at the transition between back portion 45B and seat portion 46B of seat platform 40C. The curved portions of the retainer components are configured in a manner to selectively engage or disengage with corresponding portions of suitably aligned retainer complements with relative movement about rotary axis 52B. In the example shown, axis 52B includes a shaft or a spindle, and in one example, includes a bearing.

In some examples, the retainer components and retainer complements are affixed to either or both of the base platform 30C and seat platform 40C in a static or stationary position. The retainer component positions and configurations are aligned with the positions and configurations of the retainer complements. Rotary movement about axis 52B brings the retainer pairs into regular engagement (interlocking relationship) or regular disengagement.

In some examples, a retainer component or a retainer complement is configured to articulate in a manner to selectively align or interlock. For example, a retainer component can include a hook element that can be repositioned independent of movement about the rotary axis 52B.

Figure 3:
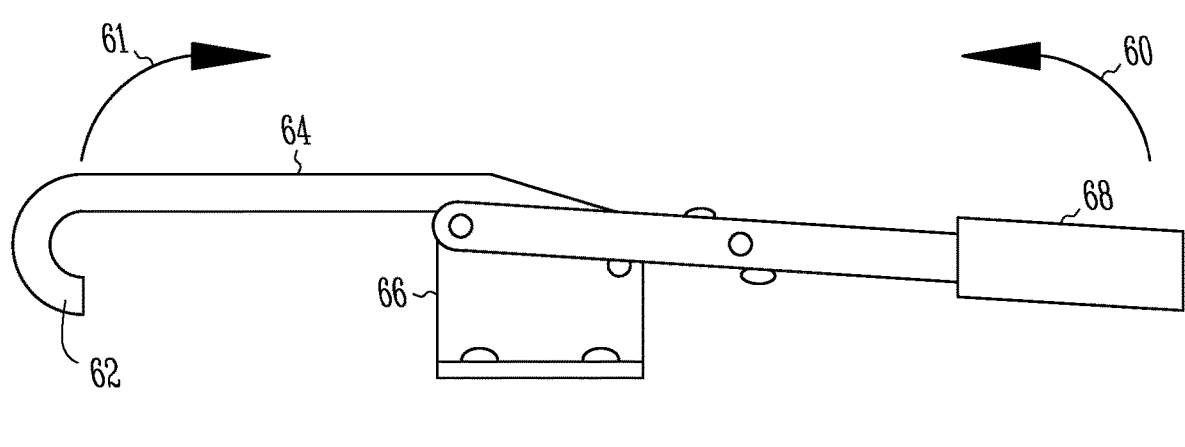
FIG. 3 illustrates an articulating retainer component, according to one example.

FIG. 3 illustrates a retainer component in the form of an articulating hook element, according to one example. In the figure, curved portion 62 of the hook element is coupled to shank 64. Shank 64 is pivotally affixed to mounting plate 66. Actuator 68 is coupled to mounting plate 66 and shank 64 by a linkage and pivot joints. In the example shown, actuator 68 includes a handle configured for manual positioning. In other examples, actuator 68 includes an electric solenoid or motor. Movement of actuator 68 in the direction shown by arrow 60 causes shank 64 to travel in the direction shown by arrow 61.

In various examples, an articulating retainer component can be configured to travel about a radius in order to engage or disengage with a retainer complement element. In some examples, an articulating retainer component, such as a hook element can be configured to provide a clamping force to draw a retainer complement (such as another hook or a catch plate) into position and thus lock together, for example, the base platform 30C and seat platform 40C. A clamping force can include a tensile load exerted on the retainer pair in order to ensure positive engagement of the coupling.

In one example, an articulating retainer component can include a threaded fastener and a rotary driver, such as a motor, to selectively move a hook element into engagement or disengagement.

Figure 4:
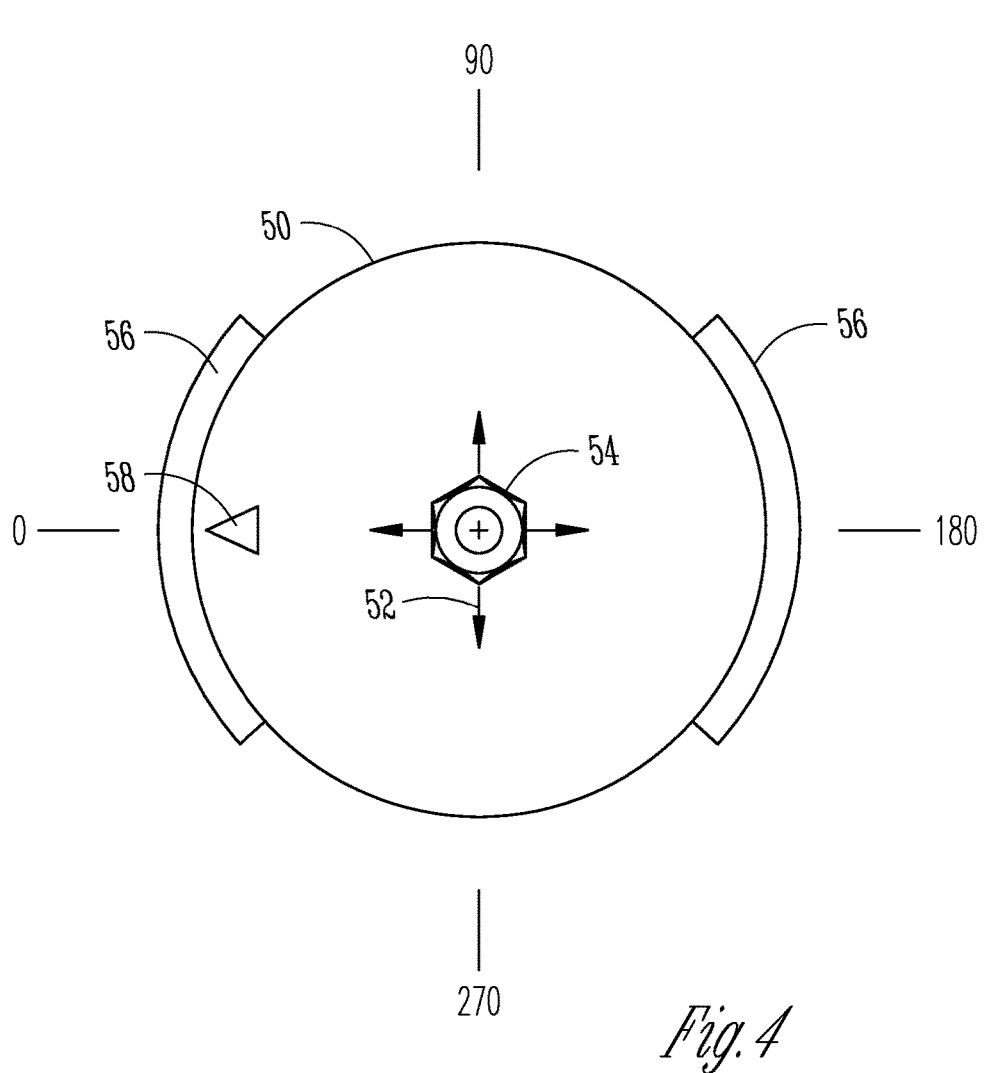
FIG. 4 illustrates a view of a swivel joint, according to one example.

FIG. 4 illustrates a view of swivel joint 50, according to one example. In the figure, index 58 indicates 0 degree alignment about rotary axis 52A, which can be interpreted to indicate a first position, such as a forward-facing direction. Swivel joint 50 includes ears 56 proximate the 0 degree alignment position and 180 degree alignment position and provides clearance proximate 90 and 270 degree alignment positions. Swivel joint 50 is secured by fastener 54. Fastener 54 can include a threaded component (such as a nut or a bolt) or an unthreaded fastener such as a circlip, retainer pin, or other fastener requiring a tool for removal or installation. Assembly and disassembly of the seat platform relative to the base platform can include movement of the swivel joint 50 in an axial direction. In one example, swivel joint 50 is affixed by a user-operable fastener that allows for removal and installation without resort to a tool. An example of a toolless fastener can include a fast-pitch (course thread) handwheel fastener.

In one example, when base platform 30C and seat platform 40C are aligned as indicated at the 0 degree (forward-facing) position or 180 degree (rearward-facing) position, swivel joint 50 is configured to interlock selected retainer pairs of the seat 10A in a manner to transfer mechanical forces to the motor vehicle 15.

Further, when base platform 30C and seat platform 40C are aligned as indicated at the 90 degree or 270 degree positions, swivel joint 50 is configured such that a selected retainer component is clear of a selected retainer complement. In this manner, base platform 30C and seat platform 40C can be separated. These alignment positions may be user-selected to facilitate occupant loading and unloading or to facilitate installing or removing child seat 10A from motor vehicle 15.

Figure 5:
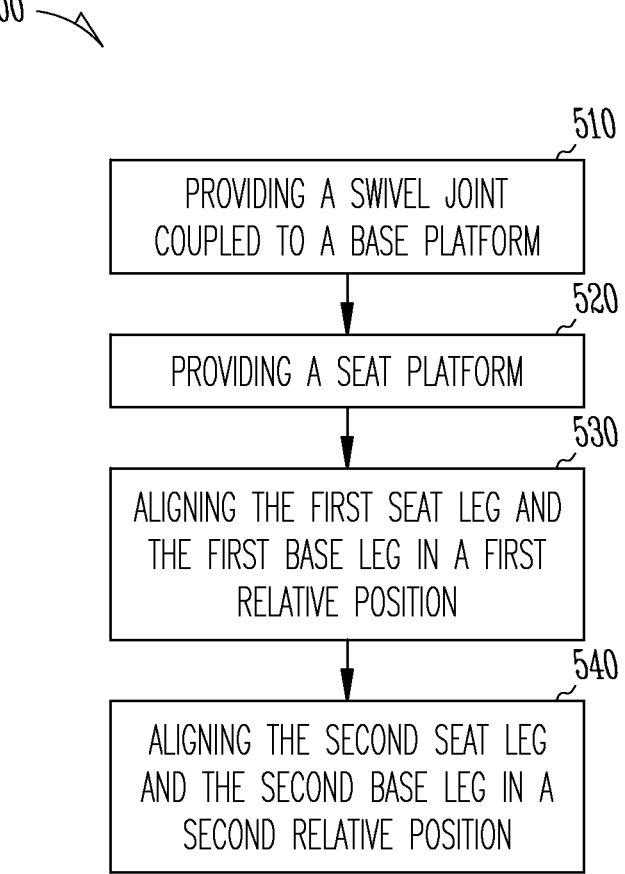
FIG. 5 illustrates a flow chart of a method, according to one example.

FIG. 5 illustrates a flow chart of method 500, according to one example. Method 500 relates to a method of manufacturing a child seat as described herein. At 510, method 500 includes providing a swivel joint coupled to a base platform. The swivel joint can be rigidly connected to the base platform or the swivel joint can be rotatably connected to the base platform. The base platform is configured for fitment with a vehicle seat. The base platform can be fitted to the vehicle seat by an anchor, by a seat belt, or by other fastening mechanism. The base platform can have a first retainer component and a second retainer component.

At 520, method 500 includes providing a seat platform configured for coupling with the swivel joint. The seat platform includes a first seat retainer complement and a second seat retainer complement. Each retainer component of the base platform is configured to engage with at least one retainer complement of the seat platform. The swivel joint is configured to permit relative motion of the base platform and the seat platform about a rotary axis and constrain motion on other axes.

At 530, method 500 includes aligning the first seat retainer complement and the first base retainer component when the base platform and the seat platform are in a first relative position.

At 540, method 500 includes aligning the second seat retainer complement and the second base retainer component when the base platform and the seat platform are in a second relative position, the second relative position different than the first relative position.

Various Notes

In one embodiment to solve at least one of the above mentioned problems a device comprising a base platform, a seat platform and a swivel joint is provided. The base platform is configured for affixation to an occupant seat of a motor vehicle and has a first base retainer component and a second base retainer component. The seat platform has a seat portion and a back portion, and a first seat retainer complement and a second seat retainer complement. The swivel joint is coupled to the base platform and coupled to the seat portion, and is configured to permit relative motion of the base platform and the seat platform about a rotary axis and preferably constrain motion on other axes. At a first position of the base platform relative to the seat platform, the first seat retainer complement aligns with the first base retainer component. At a second position of the base platform relative to the seat platform, the second position different than the first position, the second seat retainer complement aligns with the second base retainer component. Preferably, at the first position of the base platform relative to the seat platform, the second seat retainer complement does not align with the second base retainer component, and at the second position of the base platform relative to the seat platform the first seat retainer complement does not align with the first base retainer component.

The first position and the second position may be oriented in directions opposite to each other, in particular the first position may be a forward facing position, and the second position may be a rearward facing position.

The rotary axis may be an essentially vertical axis, or may be slightly inclined to the front, e.g. by an angle of maximum 20°, preferably maximum 10°. In some embodiments the rotary axis may be defined by an axle. Rotary movement about the rotary axis may bring the retainer pairs into regular engagement (interlocking relationship) or regular disengagement.

The seat platform may comprise a retention structure such as a harness or a shield for binding an occupant to the seat platform. The retention structure may comprise one or several of a strap, a belt, and a buckle.

At least one of the retainer components and the retainer complements may include a hook, a cleat, a bolt, a flange, a stud, a rail, a track, a channel, a latch, a slot, or a catch.

A fastener for securing the swivel joint to the seat platform may comprise a fastener component provided at one of the seat platform and the swivel joint, and a fastener complement provided at the other one of the seat platform and the swivel joint. The fastener component may comprise at least one rod or bar, and the fastener complement may comprise at least one moveable hook, in particular a rotatable hook.

A retainer component or a retainer complement can be configured to project from the seat platform in a direction toward the base platform and similarly, project from the base platform in a direction toward the seat platform.

A child seat according to one example can include similar or dissimilar retainer pairs. For example, a first retainer pair can include a cleat configuration (as shown in FIG. 2B) and a second retainer pair can include a retainer component in the form of a hook and a retainer complement in the form of a flange.

In various examples, the child seat is fabricated of a combination of metal and plastic components. To maintain structural rigidity and robust coupling of the retainer pairs, the seat platform and the base platform can be fabricated of a polymeric material, such as polypropylene, having reinforcement elements to withstand forces encountered in affixing the child seat in a motor vehicle, forces encountered in placement of an occupant in the child seat, forces encountered in repositioning relative alignment of the seat platform and base platform, and forces encountered in the event of a rapid deceleration.

In one example of the present subject matter, in a first position (such as a forward-facing position), a first base retainer component is engaged with a first seat retainer complement, a second base retainer component is not engaged, and a third base retainer component is engaged with a third seat retainer complement.

In one example of the present subject matter, in a second position (such as a rearward-facing position), a first base retainer component is not engaged, a second base retainer component is engaged with a second seat retainer complement, and a third base retainer component is not engaged. Preferably, the first retainer component, the second retainer component and the third retainer component of the present example are identical with the first retainer component, the second retainer component and the third retainer component disclosed in the directly preceding example.

In a first example, the present subject matter includes a device having a base platform having a first base retainer component and a second base retainer component. The device includes a seat platform having a first seat retainer complement and a second seat retainer complement. In a first position of the seat platform relative to the base platform, the first retainer pair, including the first base retainer component and the first seat retainer complement, are engaged and the second retainer pair, including the second base retainer component and the second seat retainer complement, are disengaged. In a second position of the seat platform relative to the base platform, the first retainer pair is disengaged and the second retainer pair is engaged.

In a second example, the device includes a third retainer pair, including a base platform having a third base retainer component and the seat platform including a third seat retainer complement, and when in the first position, the third base retainer component and the third seat retainer complement are aligned, in particular engaged.

In a third example, in the first position, the first seat retainer complement interlocks with the first base retainer component, the third seat retainer complement interlocks with the third base retainer component, or both the first seat retainer complement interlocks with the first base retainer component and the third seat retainer complement interlocks with the third base retainer component. Additionally, or alternatively, in the second position, the second seat retainer complement interlocks with the second base retainer component.

In a fourth example, at least one of the third base retainer component and the third seat retainer complement includes a cantilevered arm.

In a fifth example, at least one of the third base retainer component and the third seat retainer complement includes a flange.

In a sixth example, at least one of the third base retainer component and the third seat retainer complement are configured to articulate.

In a seventh example, the third seat retainer complement is coupled to the seat portion, in particular at a location proximate to a junction or transition between back portion and seat portion.

In an eighth example, in the first position, the first seat retainer complement interlocks with the first base retainer component.

In a nineth example, in the second position, the second seat retainer complement interlocks with the second base retainer component.

In a tenth example, at least one of the first base retainer component, the second base retainer component, the first seat retainer complement, and the second seat retainer complement includes a cantilevered arm.

In an eleventh example, at least one of the first base retainer component, the second base retainer component, the first seat retainer complement, and the second seat retainer complement includes a flange.

In a twelfth example, at least one of the first base retainer component, the second base retainer component, the first seat retainer complement, and the second seat retainer complement are configured to articulate.

In a thirteenth example, the first position and the second position differ by approximately or exactly 180 degrees.

In a fourteenth example, the first seat retainer complement is coupled to the back portion.

In a fifteenth example, the second seat retainer complement is coupled to the seat portion, in particular at a location distal to a junction or transition between back portion and seat portion.

In a sixteenth example, the base platform includes a lower portion and an upper portion. The first base retainer component may be affixed to the upper portion, the second base retainer component may be affixed at a location proximate to a junction or transition between the upper portion and the lower portion, or both the first base retainer component may be affixed to the upper portion and the second base retainer component may be affixed at a location proximate to a junction or transition between the upper portion and the lower portion. A third base retainer component may be also affixed at a location proximate the junction between the upper portion and lower portion.

In a seventeenth example, the base platform includes anchoring means configured to couple with the motor vehicle. The anchoring means may comprise at least one anchor. The anchoring means may be provided in the form of lower anchors or an Isofix system, e.g. according to ISO 13216, for securing or affixing the base platform releasably to the vehicle. The anchoring means may include fasteners such as clips. The anchoring means may comprise a belt, a metal strap, a plastic strap, a cord, a chain or a cable.

In an eighteenth example, the swivel joint is coupled to the lower portion. The swivel joint may be designed to preclude axial movement in a direction aligned with the rotary axis, and to preclude movement in a shear direction relative to the rotary axis. The precluded movement may refer to a movement of the swivel joint relative to one or both of the base platform and the seat platform.

In a nineteenth example, the first base retainer component is coupled to the upper portion.

In a twentieth example, the second base retainer component is coupled proximate a junction of the upper portion and the lower portion.

In a twenty-first example, the swivel joint includes a fastener which precludes toolless separation of the base platform and one of the seat platform and the base platform. One of the seat platform and the base platform may comprise an actuator allowing for toolless separation of the swivel joint and the other one of the seat platform and the base platform.

In a twenty-second example, at a third position of the base platform relative to the seat platform, the third position different than the first position and different than the second position, the swivel joint is configured for axial movement of the base platform relative to the seat platform.

In a twenty-third example, a method includes providing a swivel joint coupled to a base platform. The base platform is configured for fitment with a vehicle seat. The base platform has a first base retainer component and a second base retainer component. The method includes providing a seat platform configured for coupling with the swivel joint. The seat platform has a first seat retainer complement and a second seat retainer complement. The swivel joint is configured to permit relative motion of the base platform and the seat platform about a rotary axis and constrain motion on other axes. The method includes aligning the first seat retainer complement and the first base retainer component when the base platform and the seat platform are in a first relative position. The method includes aligning the second seat retainer complement and the second base retainer component when the base platform and the seat platform are in a second relative position. The second relative position different than the first relative position.

In a twenty-fourth example, providing the seat platform includes integrally forming at least one of the first seat retainer complement and the second seat retainer complement. Integral forming can include fabricating the seat platform and the retainer complement of a unitary material.

In a twenty-fifth example, providing the base platform includes integrally forming at least one of the first base retainer component and the second base retainer component.

In a twenty-sixth example, providing the seat platform includes forming a third seat retainer complement.

In a twenty-seventh example, providing the base platform includes forming a third base retainer component.

In a twenty-eighth example, the method includes coupling the base platform and the seat platform via the swivel joint.

In a twenty-nineth example, coupling the base platform and the seat platform includes securing a fastener. Securing a fastener can include installing a pin, engaging threads, forming a bond, welding, soldering, or other joining techniques.

In a thirtieth example, the method includes forming at least one of the first base retainer component and the second base retainer component of the base platform.

In a thirty-first example, forming includes assembling an articulated joint. An articulated joint can include a mechanical linkage, a threaded joint, a rotary joint, or a prismatic joint.

In a thirty-second example, the method includes forming at least one of the first seat retainer complement and the second seat retainer complement of the seat platform.

In a thirty-third example, forming includes assembling an articulated joint.

In a thirty-fourth example the base is configured to cooperate with external attachment means such as a vehicle belt for affixing the base platform releasably to the vehicle, wherein the base may comprise for such cooperation guiding means like a channel or a recess preferably extending in a left right direction.

In a thirty-fifth example the swivel joint is affixed rigidly, or immobilized on, one of the base platform and the seat platform, and rotatable independent from the other one of the base platform and the seat platform. The swivel joint may include a rotary bearing assembly which can include a plain bushing, a roller bearing, a needle bearing, a fifth wheel (bolster plate), or other structure to enable rotation about the rotary axis and prevent or resist movement along an axis other than the rotary axis. The swivel joint may be secured to one or both of the seat platform and the base platform by a threaded component or by an unthreaded fastener. A releasable locking mechanism may be provided for selectively locking the independent rotation of the swivel joint with respect to one of the seat platform and the base platform, the locking mechanism comprising at least a latch and an actuator for urging the latch to be transferred from a locking position to a non-locking position, and preferably comprising also a spring for biasing the latch to the locking position.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A device comprising:
a base platform configured for affixation to an occupant seat of a motor vehicle, the base platform having a first base retainer component and a second base retainer component;
a seat platform having a seat portion and a back portion, the seat platform having a first seat retainer complement and a second seat retainer complement;
a swivel joint coupled to the base platform and coupled to the seat portion, the swivel joint configured to permit relative motion of the base platform and the seat platform about a rotary axis and constrain motion on other axes;

wherein at a first position of the base platform relative to the seat platform, the first seat retainer complement aligns with the first base retainer component;
wherein at a second position of the base platform relative to the seat platform, the second position different than the first position, the second seat retainer complement aligns with the second base retainer component; and
wherein one or both of: in the first position, the second base retainer component is not engaged, and the base platform has a third base retainer component that is not engaged in the second position.

2. The device of claim 1 wherein the seat platform includes a third seat retainer complement and wherein, in the first position, the third base retainer component aligns with the third seat retainer complement.

3. The device of claim 2 wherein at the first position, the third seat retainer complement interlocks with the third base retainer component.

4. The device of claim 2 wherein at least one of the third base retainer component and the third seat retainer complement includes a cantilevered arm or a flange.

5. The device of claim 2 wherein at least one of the third base retainer component and the third seat retainer complement are configured to articulate.

6. The device of claim 2 wherein the third seat retainer complement is coupled to the seat portion.

7. The device of claim 1 wherein at the first position, the first seat retainer complement interlocks with the first base retainer component or wherein at the second position, the second seat retainer complement interlocks with the second base retainer component.

8. The device of claim 1 wherein at least one of the first base retainer component, the second base retainer component, the first seat retainer complement, and the second seat retainer complement includes a cantilevered arm or a flange.

9. The device of claim 1 wherein the first position and the second position differ by approximately 180 degrees.

10. The device of claim 1 wherein the first seat retainer complement is coupled to the back portion or wherein the second seat retainer complement is coupled to the seat portion.

11. The device of claim 1 wherein the base platform includes a lower portion and an upper portion.

12. The device of claim 11 wherein the base platform includes at least one anchor configured to couple with the motor vehicle.

13. The device of claim 11 wherein the swivel joint is coupled to the lower portion.

14. The device of claim 11 wherein the first base retainer component is coupled to the upper portion or wherein the second base retainer component is coupled proximate a junction of the upper portion and the lower portion.

15. The device of claim 1 wherein the swivel joint includes a fastener which precludes toolless separation of one or both of the base platform and the seat platform.

16. The device of claim 1 wherein at a third position of the base platform relative to the seat platform, the third position different than the first position and different than the second position, the swivel joint is configured for axial movement of the base platform relative to the seat platform.

17. A method comprising:
providing a swivel joint coupled to a base platform, the base platform configured for fitment with a vehicle seat and the base platform having a first base retainer component, a second base retainer component and a third base retainer component;

providing a seat platform configured for coupling with the swivel joint, the seat platform having a first seat retainer complement and a second seat retainer complement, the swivel joint configured to permit relative motion of the base platform and the seat platform about a rotary axis and constrain motion on other axes;

aligning the first seat retainer complement and the first base retainer component when the base platform and the seat platform are in a first relative position; and aligning the second seat retainer complement and the second base retainer component when the base platform and the seat platform are in a second relative position, the second relative position different than the first relative position wherein one or both of: in the first relative position, the second base retainer component is not engaged, and the third base retainer component that is not engaged in the second relative position.

18. The method of claim 17 wherein providing the seat platform includes integrally forming at least one of the first seat retainer complement and the second seat retainer complement or wherein providing the base platform includes integrally forming at least one of the first base retainer component and the second base retainer component.

19. The method of claim 17 wherein providing the seat platform includes forming a third seat retainer complement.

20. The method of claim 17 further including coupling the base platform and the seat platform via the swivel joint.

21. The method of claim 20 wherein coupling the base platform and the seat platform includes securing a fastener.

22. The method of claim 17 further including forming at least one of the first base retainer component and the second base retainer component of the base platform.

23. The method of claim 22 wherein forming includes assembling an articulated joint.

24. The method of claim 17 further including forming at least one of the first seat retainer complement and the second seat retainer complement of the seat platform.

25. The method of claim 24 wherein forming includes assembling an articulated joint.

26. A device comprising:

a base platform configured for affixation to an occupant seat of a motor vehicle, the base platform having a first base retainer component and a second base retainer component;

a seat platform having a seat portion and a back portion, the seat platform having a first seat retainer complement and a second seat retainer complement;

a swivel joint coupled to the base platform and coupled to the seat portion, the swivel joint configured to permit relative motion of the base platform and the seat platform about a rotary axis and constrain motion on other axes;

wherein at a first position of the base platform relative to the seat platform, the first seat retainer complement aligns with the first base retainer component;

wherein at a second position of the base platform relative to the seat platform, the second position different than the first position, the second seat retainer complement aligns with the second base retainer component; and wherein at least one of the first base retainer component, the second base retainer component, the first seat retainer complement, and the second seat retainer complement are configured to articulate.

* * * * *